US012650101B2

(12) United States Patent
Cho et al.

(10) Patent No.: US 12,650,101 B2
(45) **Date of Patent: *Jun. 9, 2026**

(54) WATER MANAGEMENT SYSTEM FOR A HYDROGEN ENGINE

(71) Applicants: HYUNDAI MOTOR COMPANY, Seoul (KR); KIA CORPORATION, Seoul (KR); Hyundam Industrial Co., Ltd., Asan-si (KR)

(72) Inventors: Seong Cheol Cho, Seoul (KR); Ju Tae Song, Hwaseong-si (KR); Seung Hwan Kim, Pyeongtaek-si (KR); Hyun Jeong Lim, Hwaseong-si (KR); Sung Won Lee, Hwaseong-si (KR); Seon Woo Boo, Hwaseong-si (KR); Yong Taek Hwang, Cheonan-si (KR); Bu Hyeon Cho, Cheonan-si (KR); Seung Hwan Lee, Cheonan-si (KR)

(73) Assignees: HYUNDAI MOTOR COMPANY, Seoul (KR); KIA CORPORATION, Seoul (KR); Hyundam Industrial Co., Ltd., Asan-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/959,120

(22) Filed: Nov. 25, 2024

(65) Prior Publication Data

US 2025/0264078 A1 Aug. 21, 2025

(30) Foreign Application Priority Data

Feb. 19, 2024 (KR) ........................ 10-2024-0023159

(51) Int. Cl.
*F02M 25/022* (2006.01)

(52) U.S. Cl.
CPC .... *F02M 25/0222* (2013.01); *F02M 25/0221* (2013.01)

(58) Field of Classification Search
CPC ........................ F02M 25/0221; F02M 25/0222
See application file for complete search history.

(56) References Cited

U.S. PATENT DOCUMENTS 3,696,795 A * 10/1972 Smith .................... F02M 25/00 123/25 C
4,337,732 A 7/1982 Gerry
(Continued)

FOREIGN PATENT DOCUMENTS

CN 114483334 B 10/2022
JP 4098712 B2 3/2008
(Continued)

*Primary Examiner* — Kevin A Lathers
(74) *Attorney, Agent, or Firm* — Lempia Summerfield Katz LLC

(57) ABSTRACT

A water management system for a hydrogen engine can reduce the volume of a water tank for storing therein cooling water to be injected to the hydrogen engine, and eliminate the need to refill the water tank. The water management system includes a water tank including a main space portion configured to store therein water for cooling the hydrogen engine and a sub space portion into which exhaust gas generated in the hydrogen engine is supplied. The water management system also includes: a water pump, provided in the water tank, to supply water stored in the main space portion of the water tank to the hydrogen engine; and an exhaust line, provided between the hydrogen engine and the water tank, and configured to deliver exhaust gas, containing water vapor, discharged from the hydrogen engine to the sub space portion of the water tank.

17 Claims, 7 Drawing Sheets

(56) References Cited

U.S. PATENT DOCUMENTS

| | | | | |
|---|---|---|---|---|
| 10,018,156 | B1 | 7/2018 | Mcquillen | |
| 12,140,068 | B1 * | 11/2024 | Boo | F01P 3/20 |
| 2003/0230250 | A1 * | 12/2003 | Chang Lin | F01P 3/02 123/41.54 |
| 2004/0089486 | A1 * | 5/2004 | Harrup | H01M 16/006 180/65.245 |
| 2018/0171936 | A1 | 6/2018 | Mcquillen | |
| 2024/0141825 | A1 * | 5/2024 | Wang | F02B 57/02 |

FOREIGN PATENT DOCUMENTS

| | | | |
|---|---|---|---|
| JP | 2009079505 | A | 4/2009 |
| JP | 2012145008 | A | 8/2012 |

* cited by examiner

WATER MANAGEMENT SYSTEM FOR A HYDROGEN ENGINE

CROSS-REFERENCE TO RELATED APPLICATION

This application claims, under 35 U.S.C. § 119(a), the benefit of and priority to Korean Patent Application No. 10-2024-0023159, filed on Feb. 19, 2024, the entire contents of which are incorporated herein by reference.

TECHNICAL FIELD

The present disclosure relates to a water management system for a hydrogen engine. More particularly, it relates to a water management system for a hydrogen engine capable of reducing the volume of a water tank configured to store therein cooling water.

BACKGROUND

Recently, due to the cost issue of hydrogen fuel cells, interest in development of hydrogen engines capable of utilizing existing internal combustion engines is growing. Hydrogen engines use hydrogen as fuel and the structure thereof is the same as that of the existing internal combustion engines.

Vehicles equipped with the hydrogen engine have the great advantage of not causing air pollution, but have a significant disadvantage compared to hydrogen fuel cell vehicles in terms of range. For this reason, hydrogen engine vehicles have adopted thereto a water injection system configured to inject water to the hydrogen engine, increasing the efficiency of the hydrogen engine.

A conventional water injection system reduces the temperature within a combustion chamber of the hydrogen engine through water injection, preventing engine knocking and improving power performance and fuel efficiency of the vehicle.

However, the conventional water injection system requires a large-volume water tank to store water and a periodic refill of the water tank, which has the disadvantage of reducing vehicle's package freedom and user convenience.

The above information disclosed in this Background section is provided only to enhance understanding of the background of the present disclosure, and therefore it may contain information that does not form the prior art that is already known to a person of ordinary skill in the art.

SUMMARY

The present disclosure has been made in an effort to solve the above-described problems associated with the prior art, and an object of the present disclosure is to provide a water management system for a hydrogen engine capable of reducing the volume of a water tank configured to store therein cooling water that is to be supplied to the hydrogen engine, and eliminating the need to refill the water tank.

The object of the present disclosure is not limited to the foregoing, and other objects not mentioned herein should be clearly understood by those of ordinary skill in the art to which the present disclosure pertains based on the description below.

In one aspect of the present disclosure, a water management system for a hydrogen engine includes: a water tank including a main space portion configured to store therein water for cooling the hydrogen engine and a sub space portion into which exhaust gas generated in the hydrogen engine is supplied. The water management system further includes: a water pump, provided in the water tank and configured to supply the water stored in the main space portion of the water tank to the hydrogen engine, and an exhaust line provided between the hydrogen engine and the water tank. The exhaust line is configured to deliver exhaust gas, containing water vapor, discharged from the hydrogen engine to the sub space portion of the water tank.

In an embodiment, the water tank may be provided therein with a partition wall configured to separate the main space portion and the sub space portion from each other. Moreover, a gap through which water moves is provided between a lower surface portion of the partition wall and a lower wall portion of the water tank. Furthermore, excluding the gap, the sub space portion and the main space portion may be completely separated from each other by the partition wall.

In another embodiment, the water tank may be provided with an exhaust inlet connected to the exhaust line, and the exhaust inlet may be adjacent to the sub space portion. Moreover, an expanded portion may be disposed at an upper wall portion of the water tank, and the sub space portion may be expanded upward more than the main space portion by the expanded portion. Here, the exhaust inlet may be disposed at an upper side portion of the expanded portion.

In still another embodiment, the water tank may be provided with a cooling nozzle configured to spray the water onto the exhaust gas introduced into the sub space portion. The cooling nozzle may be connected to the water pump via an injection line and may be supplied with the water stored in the main space portion through the injection line. The water pump may be connected to the hydrogen engine via a water supply line, and the injection line may be connected to the cooling nozzle by being branched off from the water supply line.

In yet another embodiment, the water tank may be provided with a moisture separation filter configured to filter moisture contained in exhaust gas in the sub space portion. The moisture separation filter may discharge air contained in the exhaust gas in the sub space portion out of the water tank.

In still yet another embodiment, the water tank may be provided with a drain port configured to discharge water that exceeds a determined capacity of the water tank. The drain port may extend vertically upward from a lower wall portion of the water tank, and may be placed in the main space portion.

In a further embodiment, the exhaust line may further include an exhaust cooler configured to cool the exhaust gas transferred to the sub space portion.

Other aspects and embodiments of the present disclosure are discussed below.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of the present disclosure are discussed below.

BRIEF DESCRIPTION OF THE DRAWINGS

The above and other features of the present disclosure are now described in detail with reference to certain embodiments thereof illustrated in the accompanying drawings which are given hereinbelow by way of illustration only, and thus are not limitative of the present disclosure, and wherein.

Figure 1:
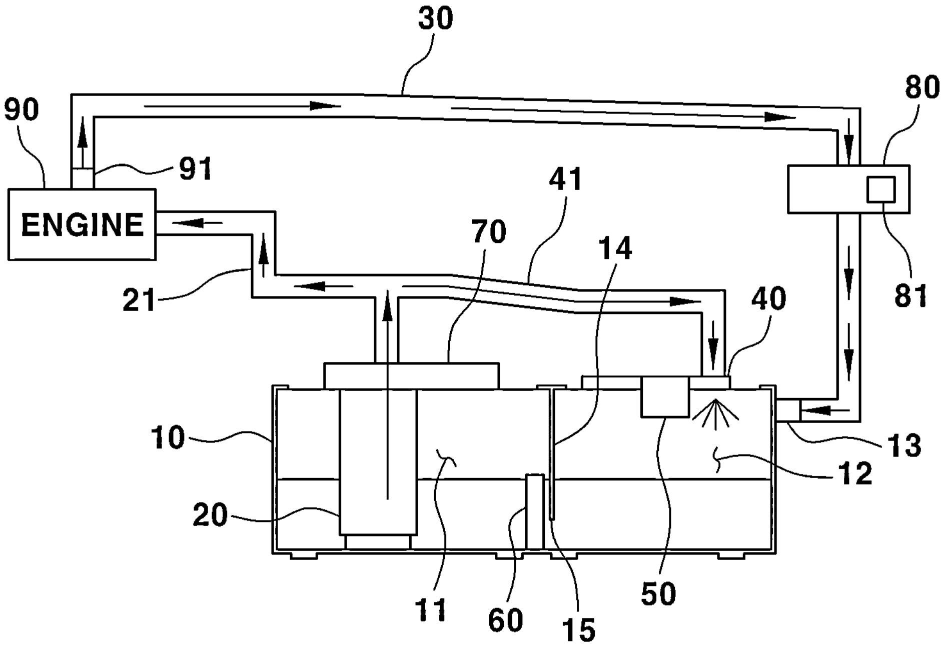
FIG. 1 is a view schematically illustrating the configuration of a water management system for a hydrogen engine according to an embodiment of the present disclosure.

It should be understood that the appended drawings are not necessarily to scale, presenting a somewhat simplified representation of various features illustrative of the basic principles of the present disclosure. The specific design features of the present disclosure, including, for example, specific dimensions, orientations, locations, and shapes, should be determined in part by the particular intended application and usage environment.

In the figures, the reference numbers refer to the same or equivalent parts of the present disclosure throughout the several figures of the drawing.

DETAILED DESCRIPTION

Hereinafter, embodiments of the present disclosure are described with reference to the accompanying drawings. The matters described in the attached drawings may be different from those actually implemented in order to facilitate description of the embodiments of the present disclosure.

The present disclosure relates to a water management system for a hydrogen engine that uses hydrogen as fuel, wherein the water management system recovers water discharged from the hydrogen engine and uses the same as cooling water for the hydrogen engine.

In other words, according to the present disclosure, the water discharged from the hydrogen engine is recovered and supplied to the hydrogen engine, thereby reducing the volume of a tank that stores therein water for cooling the hydrogen engine. Thus, there is no need to refill the tank with water.

According to an embodiment of the present disclosure, as illustrated in FIG. 1, the water management system for a hydrogen engine includes: a water tank 10 configured to store therein water for cooling a hydrogen engine 90, and a water pump 20 configured to supply the water stored in the water tank 10 to the hydrogen engine 90.

In one embodiment, an exhaust line 30 for the flow and transfer of exhaust gas is disposed between the hydrogen engine 90 and the water tank 10. Opposite ends of the exhaust line 30 are connected to an exhaust outlet 91 of the hydrogen engine 90 and an exhaust inlet 13 of the water tank 10, respectively. The exhaust line 30 may deliver and supply exhaust gas generated through hydrogen combustion in the hydrogen engine 90 to the water tank 10.

Because the hydrogen engine 90 uses hydrogen as fuel, the exhaust gas contains a large amount of water vapor. In other words, the high-temperature exhaust gas discharged from the hydrogen engine 90 has a relatively high water vapor content.

The exhaust line 30 is provided with an exhaust system 80 configured to process the exhaust gas from the hydrogen engine 90. Although not specifically illustrated, the exhaust system 80 includes an exhaust purification module 81 configured to purify the exhaust gas. The exhaust purification module 81 may include a catalytic converter configured to purify the exhaust gas discharged from the hydrogen engine 90. With this structure, contaminants in the exhaust gas are removed while the exhaust gas passes through the exhaust purification module 81, and then the exhaust gas becomes water vapor.

In other words, the exhaust gas from the hydrogen engine 90 is converted to water vapor while passing through the exhaust system 80, and becomes water vapor before reaching the exhaust inlet 13 of the water tank 10. Accordingly, the exhaust gas purified by the exhaust purification module 81 (i.e., water vapor) is supplied and introduced into the water tank 10.

Figure 2:
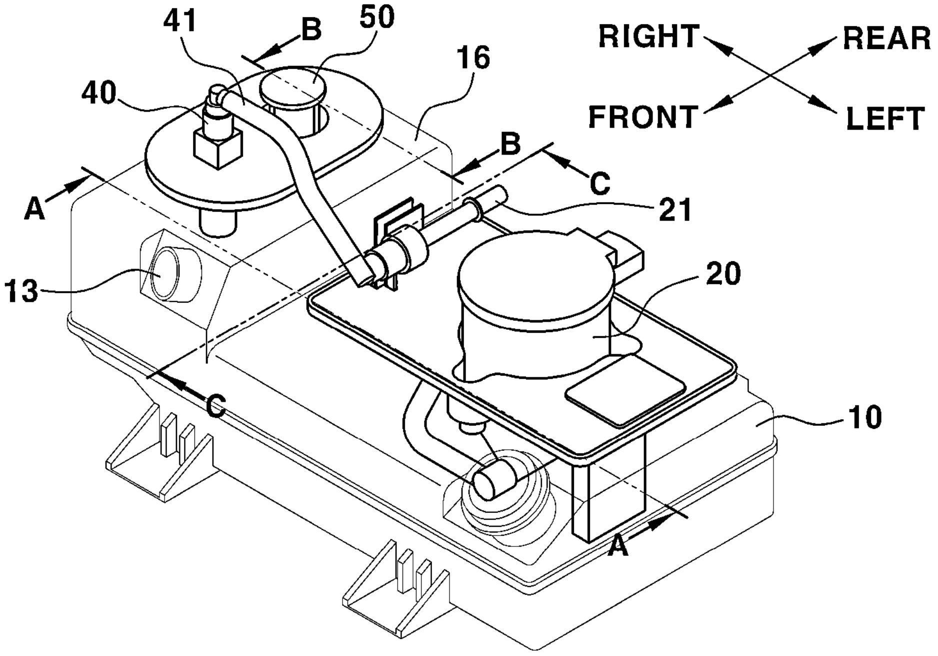
FIG. 2 is a perspective view illustrating a water tank of a water management system according to an embodiment of the present disclosure.
Figure 3:
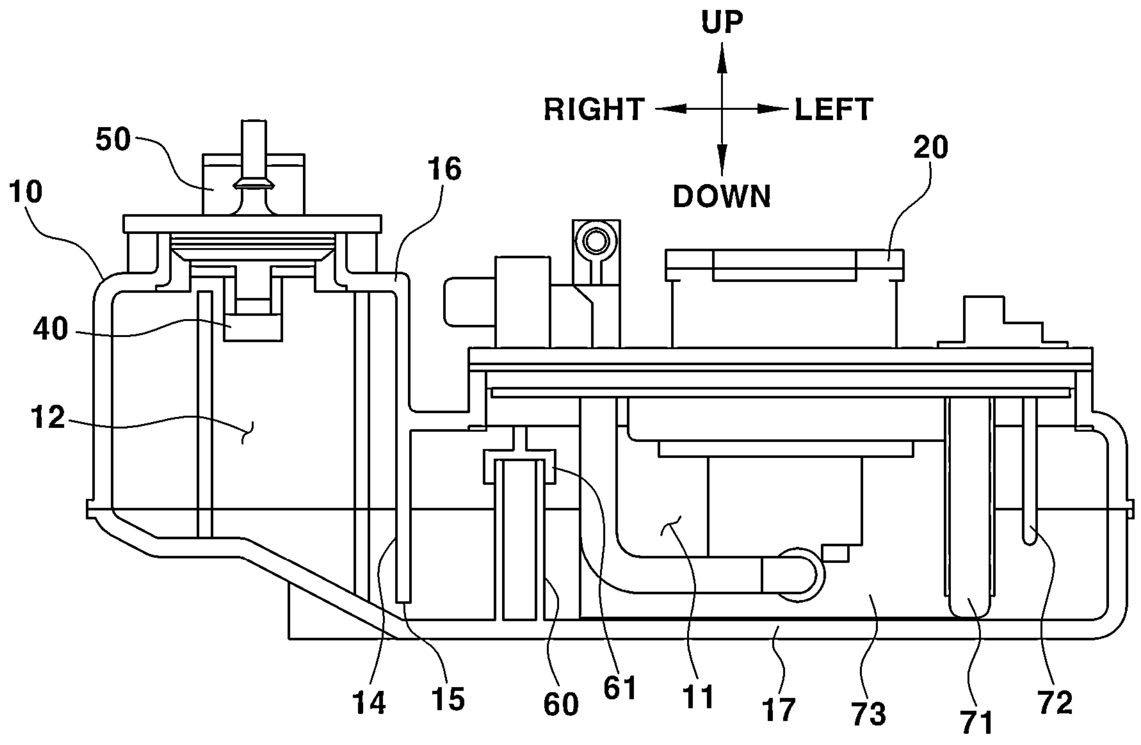
FIG. 3 is a cross sectional view seen from A-A in FIG. 2.

Referring to FIG. 2 and FIG. 3, the water tank 10 has an internal space where water for cooling the engine is stored, and the internal space is divided into a main space portion 11 and a sub space portion 12.

The main space portion 11 stores therein water that is supplied to the hydrogen engine 90 through the water pump 20. The main space portion 11 has disposed therein the water pump 20, and the water pump 20 is mounted in the water tank 10 to pump the water stored in the main space portion 11.

The sub space portion 12 receives the exhaust gas generated from the hydrogen engine 90. Specifically, the sub space portion 12 receives the exhaust gas purified while passing through the exhaust system 80 (i.e., water vapor).

In another embodiment, the water tank 10 is provided therein with a partition wall 14 to divide the internal space in the water tank 10 into the main space portion 11 and the sub space portion 12. The partition wall 14 has a structure extending downward from an upper wall portion of the water tank 10. Here, an upper surface portion of the partition wall 14 is integrated with the upper wall portion of the water tank 10, and a lower surface portion of the partition wall 14 is separated from a lower wall portion 17 of the water tank 10.

In one embodiment, a gap 15 is provided between the lower surface portion of the partition wall 14 and the lower wall portion 17 of the water tank 10. The gap 15 serves as a passage through which water condensed in the sub space portion 12 moves to the main space portion 11. The sub space portion 12 and the main space portion 11 are separated from each other by the partition wall 14 and are connected to each other through the gap 15. In other words, excluding the gap 15, the sub space portion 12 and the main space portion 11 are completely separated from each other by the partition wall 14. The gap 15 allows fluid communication between the main space portion 11 and the sub space portion 12.

In an embodiment of the present disclosure, the upper and side surface portions of the partition wall 14 may be integrated with the upper and side wall portions of the water tank 10 or may be air-tightly joined to the upper and side wall portions of the water tank 10.

The partition wall 14 provided in the water tank 10 may block water vapor in the sub space portion 12 from moving and being introduced into the main space portion 11 and also may suppress the flow of water in the water tank 10 when the vehicle is traveling, preventing the water in the water tank 10 from moving to and flowing back into the exhaust inlet 13.

Figure 4:
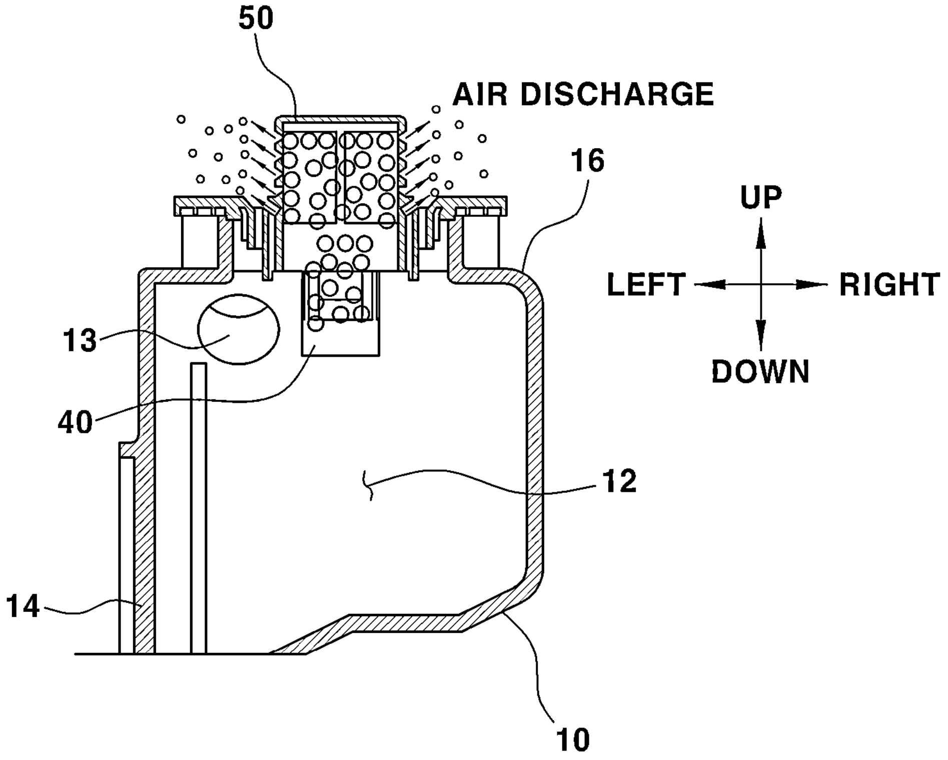
FIG. 4 is a cross sectional view seen from B-B in FIG. 2.

As illustrated in FIG. 1, the exhaust gas discharged from the exhaust outlet 91 of the hydrogen engine 90 is transferred and delivered to the exhaust inlet 13 of the water tank 10 through the exhaust line 30. The exhaust gas is then introduced into the sub space portion 12 through the exhaust inlet 13. To this end, the exhaust inlet 13 is, as illustrated in FIG. 4, provided in the water tank 10 by being adjacent to the sub space portion 12. The exhaust inlet 13 is in direct communication with the sub space portion 12.

So as to block the water vapor introduced into the sub space portion 12 (i.e., purified exhaust gas) from moving to the main space portion 11, the water tank 10 includes the partition wall 14 and also includes the exhaust inlet 13 at an upper side portion of the water tank 10. In order to more effectively block the water vapor in the sub space portion 12 from moving into the main space portion 11, the water tank 10 further includes an expanded portion 16.

Referring to FIG. 3, the expanded portion 16 protrudes to be stepped from the upper wall portion of the water tank 10. Here, the upper wall portion of the water tank 10 is bent upward at a position wherein the partition wall 14 is provided. The water tank 10 expands the internal space therein by further including the expanded portion 16. More specifically, with the water tank 10 further including the expanded portion 16, the sub space portion 12 expands upward and has a space expanded and extended higher than the main space portion 11. In other words, with the water tank 10 further including the expanded portion 16, the sub space portion 12 further includes the internal space in the expanded portion 16.

Here, the exhaust inlet 13 is disposed at a front of the sub space portion 12 with respect to a front-rear direction of a vehicle in which the water tank 10 and the hydrogen engine 90 are mounted. The sub space portion 12 is disposed at a right side of the main space portion 11 with respect to the partition wall 14. Moreover, the exhaust inlet 13 is disposed at a left side portion of the sub space portion 12 with respect to a left-right direction of the vehicle. To be more specific, the exhaust inlet 13 is disposed at an upper side portion of the expanded portion 16 provided above the sub space portion 12, and is disposed at a left side portion of the upper side portion of the expanded portion 16.

Accordingly, the exhaust inlet 13 is disposed adjacent to the partition wall 14 at a front position of the sub space portion 12. More specifically, the exhaust inlet 13 is disposed at the left side portion at a front position of the expanded portion 16, provided above the sub space portion 12, and is disposed adjacent to the partition wall 14.

Figure 6:
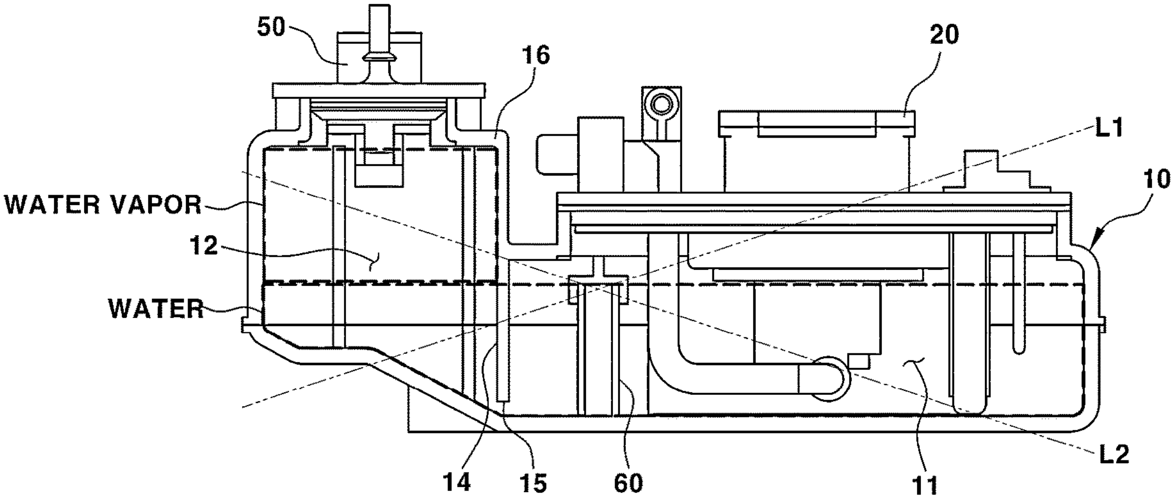
FIG. 6 and FIG. 7 are views illustrating an example of the water surface in a water tank when a vehicle travels on an incline.
Figure 7:
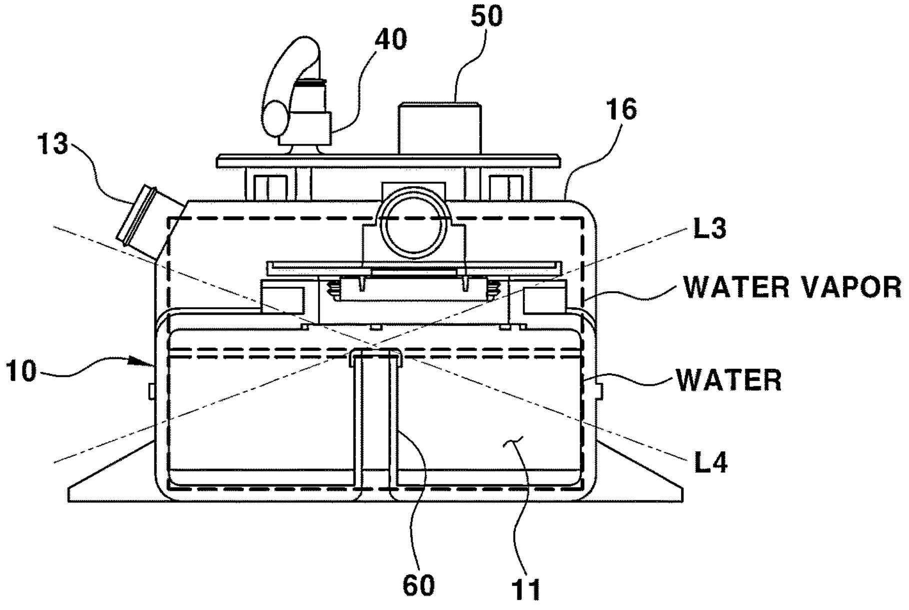

With this structure, the exhaust inlet 13 is not submerged in water in the water tank 10 even when the water tank 10 is tilted to one side, such as when a vehicle travels on an incline (see FIG. 6 and FIG. 7). Moreover, the water stored in the water tank 10 may be prevented from flowing back into the exhaust line 30 through the exhaust inlet 13. Furthermore, because the exhaust inlet 13 is disposed at the upper side portion of the expanded portion 16, water vapor introduced into the sub space portion 12 through the exhaust inlet 13 may be more effectively prevented from moving to the main space portion 11.

In one embodiment, the lower wall portion 17 of the water tank 10 may be inclined upward from a point where the partition wall 14 is disposed. Here, the lower wall portion 17 of the water tank 10 has an inclined structure at the sub space portion 12 side. Therefore, the lower wall portion 17 of the water tank 10 extends further upward than the gap 15 under the partition wall 14, preventing the water in the main space portion 11 from moving to the sub space portion 12 through the gap 15.

Furthermore, in order to quickly condense water vapor introduced into the water tank 10 (i.e., purified exhaust gas), the water tank 10 is provided with a cooling nozzle 40.

As illustrated in FIG. 1 through FIG. 3, the cooling nozzle 40 is mounted to the water tank 10 to spray water to the sub space portion 12, including the internal space in the expanded portion 16, and to the water vapor introduced into the sub space portion 12. The cooling nozzle 40 is mounted at the upper wall portion of the water tank 10 to spray water to the sub space portion 12. Here, the cooling nozzle 40 is disposed at an upper side portion of the sub space portion 12 to spray water toward the exhaust inlet 13 for discharging exhaust gas to the upper side portion of the sub space portion 12 (i.e., the internal space in the expanded portion 16).

In other words, the cooling nozzle 40 is mounted to the water tank 10 by being disposed at the upper side portion of the sub space portion 12, and may turn the water supplied from the water pump 20 into mist and spray the same to the sub space portion 12. The cooling nozzle 40 may also be called a mist nozzle.

The cooling nozzle 40 may spray low-temperature water onto high-temperature water vapor introduced into the sub space portion 12 of the water tank 10, rapidly cooling the water vapor and converting the same into water. Therefore, the water vapor introduced into the sub space portion 12 through the exhaust inlet 13 is quickly condensed in the sub space portion 12 and converted into a liquid phase, and then is moved to the main space portion 11 through the gap under the partition wall 14.

As the water vapor introduced into the water tank 10 is quickly cooled and condensed, water generation speeds up, and thus water may be continuously supplied to the hydrogen engine 90 without having to refill the water tank 10 with water. More specifically, by quickly condensing water vapor in the sub space portion 12 using the cooling nozzle 40, problems due to insufficient water recovery compared to water discharge from the water tank 10 may be prevented. Moreover, as the water vapor introduced into the sub space portion 12 is quickly condensed, the increase in internal pressure of the water tank 10 due to the influx of water vapor may be reduced.

Furthermore, in order to make the water vapor to be smoothly introduced into the sub space portion 12, the water tank 10 is provided with a moisture separation filter 50.

The moisture separation filter 50 is to filter moisture contained in the water vapor and is configured to discharge air introduced into the water tank 10 to the outside and leave moisture in the water tank 10. In other words, the moisture separation filter 50 is configured to separate moisture in the water vapor introduced into the sub space portion 12 of the water tank 10 from air and discharge only the air to the outside.

To this end, the moisture separation filter 50 is mounted at the upper wall portion of the water tank 10 so as to be disposed above the sub space portion 12. As illustrated in FIG. 4, the moisture separation filter 50 discharges air from the water vapor introduced into the sub space 12 to the outside of the water tank 10, filters out the moisture, and leaves the moisture in the sub space portion 12. In other words, the moisture separation filter 50 discharges the remaining except moisture in the components contained in the water vapor to the outside.

More specifically, for the moisture and air contained in the water vaper, the moisture separation filter 50 may block discharge of the moisture, which has a relatively large particle size, while allowing discharge of the air, which has a small particle size. The moisture separation filter 50 may include an upper side portion protruding out of the water tank 10, and the upper side portion forms an air outlet configured to discharge air.

The moisture separation filter 50 discharges only air from the water vapor introduced into the water tank 10 to the outside, preventing the increase in the internal pressure of the water tank 10 due to the inflow of water vapor. As a result, the moisture separation filter 50 may allow smooth inflow of water vapor into the water tank 10 and increase the water recovery rate to the water tank 10.

As illustrated in FIG. 1 and FIG. 2, the cooling nozzle 40 receives water from the main space portion 11 through the injection line 41. The injection line 41 branches off from the water supply line 21 connected to the water pump 20 and is connected to the cooling nozzle 40. In other words, the injection line 41 is connected to the water pump 20 via the water supply line 21, and delivers and provides water supplied from the water pump 20 to the cooling nozzle 40.

The water pump 20 is connected to the hydrogen engine 90 via the water supply line 21 and supplies water to the hydrogen engine 90. When the water pump 20 discharges water from the main space portion 11 to the water supply line 21, water is also supplied to the injection line 41. The injection line 41 delivers water supplied from the water pump 20 to the cooling nozzle 40, and the cooling nozzle 40 sprays the water, which is supplied to the cooling nozzle 40 through the injection line 41, onto the water vapor introduced into the sub space portion 12. The cooling nozzle 40 is provided at the upper wall portion of the water tank 10 to directly spray water onto the water vapor, introduced into the sub space portion 12 through the exhaust inlet 13.

Figure 5:
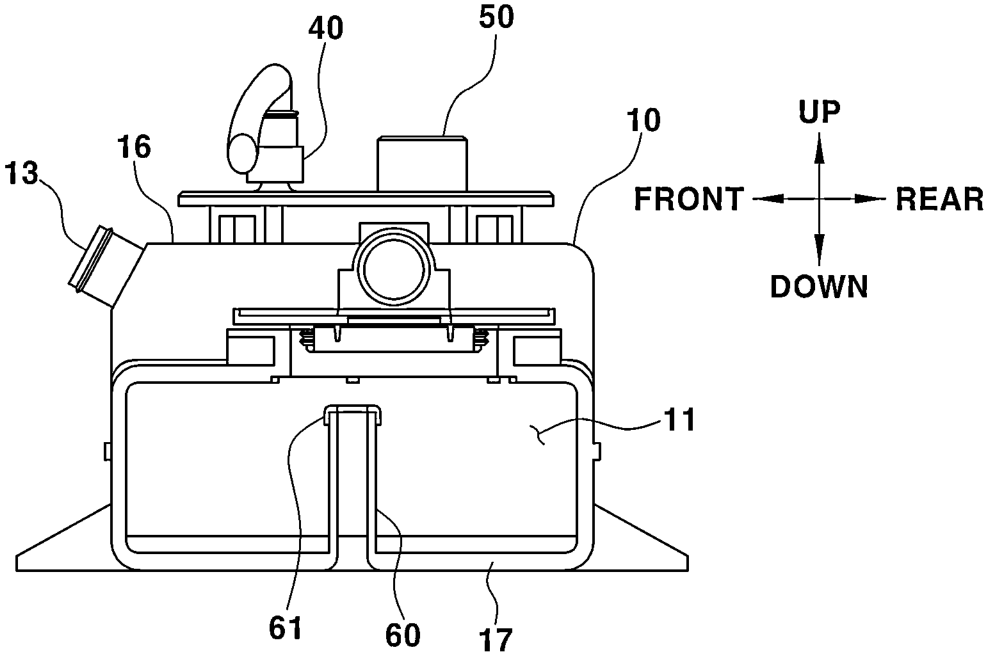
FIG. 5 is a cross sectional view seen from C-C in FIG. 2.

As illustrated in FIG. 3 and FIG. 5, the water tank 10 may include a drain port 60 configured to discharge water within the water tank 10. When water introduced into the water tank 10 exceeds a determined capacity of the water tank 10, the drain port 60 discharges the water in the water tank 10. The drain port 60 discharges water that exceeds the determined capacity of the water tank 10. Here, the determined capacity of the water tank 10 is smaller than the maximum capacity of the water tank 10. The determined capacity of the water tank 10 may also be set to be smaller than the maximum capacity of the main space portion 11.

The drain port 60 extends vertically upward from the lower wall portion 17 of the water tank 10 and has a pipe structure with open opposite ends. The drain port 60 protrudes and extends from the lower wall portion 17 of the water tank 10 to a predetermined height, so that when the water surface of the water tank 10 exceeds the top of the drain port 60, the water in the water tank 10 is discharged to the outside. The drain port 60 is disposed in the main space portion 11, and has a height smaller than the vertical height of the main space portion 11 by a predetermined value or more. As illustrated in FIG. 6 and FIG. 7, the drain port 60 may be located at the center of the water tank 10 with respect to a horizontal direction, and may be disposed between the partition wall 14 and the water pump 20. Furthermore, at the top of the drain port 60, there may be provided a screen filter 61 configured to prevent foreign substances from entering from the outside.

In FIG. 6 and FIG. 7, lines L1, L2, L3, L4 indicate the water surface in the water tank 10 as an example when the vehicle is traveling on an incline. When the water tank 10 is tilted to one side due to the vehicle traveling on an incline, the water surface in the water tank 10 is also tilted as indicated by the lines L1, L2, L3, L4. Here, the water surface may reach the cooling nozzle 40 and the exhaust inlet 13 as the water moves to one side of the water tank 10. However, the water is discharged to the outside through the drain port 60, preventing the cooling nozzle 40 and the exhaust inlet 13 from being submerged in water even when the vehicle travels on an incline.

Moreover, due to the difference in density between water vapor and water, water is stored in the lower space in the water tank 10, and water vapor is introduced into the upper space in the water tank 10 (particularly, the upper space in the sub space portion 12). More specifically, there exist both water vapor and water in the sub space portion 12, but only water exists in the main space portion 11.

Furthermore, the water tank 10 may be provided with a heater 71, a temperature sensor 72, and a pump filter 73. Water temperature information measured by the temperature sensor 72 is transmitted to a controller 70. The heater 71 is configured to heat water stored in the water tank 10 and may be controlled by the controller 70. The controller 70 may remove ice in the water tank 10 by operating the heater 71 based on the information received from the temperature sensor 72. The controller 70 may perform overall control of the water management system of the present disclosure. The controller 70 may be provided at the top of the water tank 10. The pump filter 73 is configured to prevent foreign substances from entering the water sucked by the water pump 20, and may be provided at an inlet side of the water pump 20.

Figure 8:
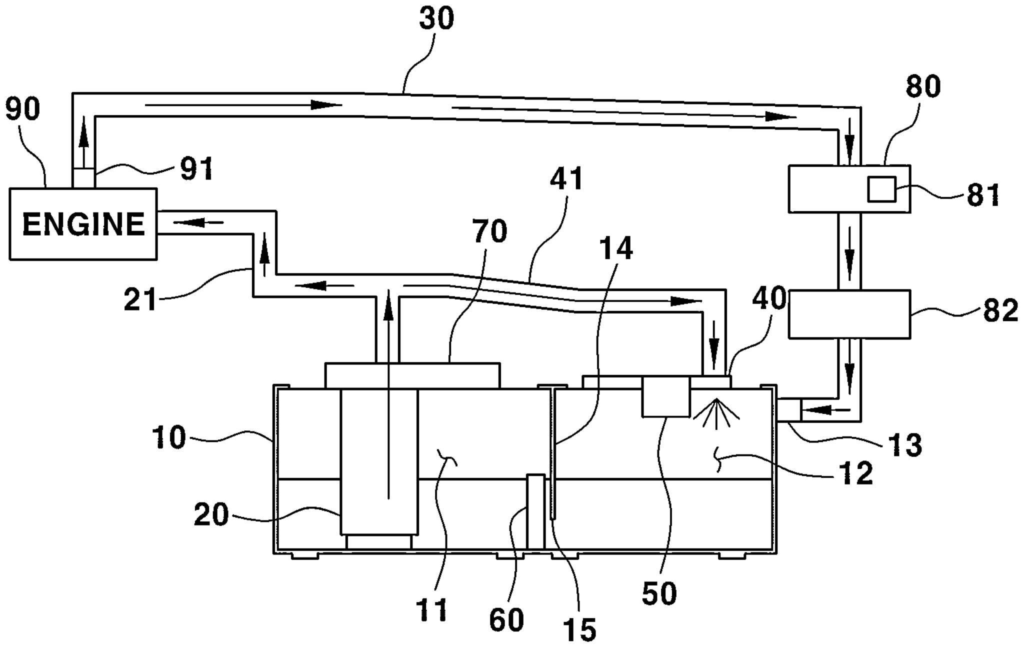
FIG. 8 is a view illustrating a water management system for a hydrogen engine according to a different embodiment of the present disclosure.

As illustrated in the embodiment of FIG. 8, at forward of the exhaust inlet 13, a cooler 82 configured to cool water vapor may further be provided. The cooler 82 may be provided in the exhaust line 30 by being disposed rearward of the exhaust system 80. The cooler 82 is configured to cool the water vapor delivered to the sub space portion 12 of the water tank 10 (i.e., purified exhaust gas). Therefore, as the cooler 82 is provided forward of the exhaust inlet 13, the water vapor introduced into the sub space portion 12 may be more quickly condensed.

As is apparent from the above description, the present disclosure provides the following effects.

First, water vapor in exhaust gas is recovered and condensed to generate water, reducing the volume of a water tank for storing water that is to be supplied and injected to the hydrogen engine, and eliminating the need to periodically refill the water tank. Accordingly, vehicle's package freedom and user convenience may be improved, and making it possible to reduce vehicle weight and increase marketability.

Second, water is injected to the hydrogen engine to reduce the temperature within the combustion chamber of the hydrogen engine, preventing engine knocking and improving power performance and fuel efficiency of the vehicle.

Effects of the present disclosure are not limited to what has been described above, and other effects not mentioned herein should be clearly recognized by those having ordinary skill in the art based on the above description.

Terms or words used in this specification and claims described below should not be construed as being limited to conventional or dictionary meanings. In addition, the scope of the present disclosure is not limited to the above-described embodiments, and various modifications and improvements by those having ordinary skill in the art using the basic concept of the present disclosure as defined in the claims below should also be included in the scope of the present disclosure.

What is claimed is:

1. A water management system for a hydrogen engine, the water management system comprising:

a water tank comprising:

a main space portion configured to store therein water for cooling the hydrogen engine, and a sub space portion into which exhaust gas generated in the hydrogen engine is supplied;

a water pump provided in the water tank and configured to supply the water stored in the main space portion of the water tank to the hydrogen engine; and an exhaust line provided between the hydrogen engine and the water tank and configured to deliver exhaust gas, containing water vapor, discharged from the hydrogen engine to the sub space portion of the water tank.

2. The water management system of claim 1, wherein the water tank is provided therein with a partition wall configured to separate the main space portion and the sub space portion from each other.

3. The water management system of claim 2, wherein a gap through which water moves is provided between a lower surface portion of the partition wall and a lower wall portion of the water tank.

4. The water management system of claim 3, wherein, excluding the gap, the sub space portion and the main space portion are separated from each other by the partition wall.

5. The water management system of claim 2, wherein the water tank is provided with an exhaust inlet connected to the exhaust line, and the exhaust inlet is adjacent to the sub space portion.

6. The water management system of claim 5, wherein the exhaust inlet is disposed at a front of the sub space portion with respect to a front-rear direction of a vehicle in which the water tank is mounted.

7. The water management system of claim 5, wherein the sub space portion is disposed at a right side of the main space portion with respect to the partition wall, and the exhaust inlet is disposed adjacent to the partition wall at a front of the sub space portion.

8. The water management system of claim 5, wherein an expanded portion is disposed at an upper wall portion of the water tank, and wherein the sub space portion is expanded upward more than the main space portion by the expanded portion.

9. The water management system of claim 8, wherein the exhaust inlet is disposed at an upper side portion of the expanded portion.

10. The water management system of claim 5, wherein the water tank is provided with a cooling nozzle configured to spray water onto exhaust gas introduced into the sub space portion.

11. The water management system of claim 10, wherein the cooling nozzle is disposed at an upper side portion of the sub space portion to spray the water toward the exhaust inlet configured to discharge the exhaust gas to the upper side portion of the sub space portion.

12. The water management system of claim 10, wherein the cooling nozzle is connected to the water pump via an injection line, and the cooling nozzle is supplied with the water stored in the main space portion through the injection line.

13. The water management system of claim 12, wherein the water pump is connected to the hydrogen engine via a water supply line, and the injection line is connected to the cooling nozzle by being branched off from the water supply line.

14. The water management system of claim 1, wherein the water tank is provided with a moisture separation filter configured to filter moisture contained in the exhaust gas in the sub space portion, and wherein the moisture separation filter is configured to discharge air contained in the exhaust gas in the sub space portion out of the water tank.

15. The water management system of claim 1, wherein the water tank is provided with a drain port configured to discharge water that exceeds a determined capacity of the water tank.

16. The water management system of claim 15, wherein the drain port extends upward from a lower wall portion of the water tank and is placed in the main space portion.

17. The water management system of claim 1, wherein the exhaust line further comprises an exhaust cooler configured to cool the exhaust gas transferred to the sub space portion.

* * * * *